(12) United States Patent
Huerta Ortiz et al.

(10) Patent No.: US 12,161,965 B2
(45) Date of Patent: Dec. 10, 2024

(54) VOLUME COMPENSATING DEVICE FOR ADSORBENT FILL COMPENSATION IN AN EVAPORATIVE EMISSIONS CANISTER

(71) Applicant: DELPHI TECHNOLOGIES IP LIMITED, St. Michael (BB)

(72) Inventors: Angel Huerta Ortiz, Cd. Juarez (MX); Victor Hugo Alvarado Bautista, Cd. Juarez (MX); Jorge Alberto Perea Urbina, Ciudad Juarez (MX); Luz Nadir Avila Arambula, Ciudad Juarez (MX); Jose Mauricio Alonso, Ciudad Juarez (MX); Cesar Cain Chavez Sandoval, Ciudad Juarez (MX)

(73) Assignee: PHINIA JERSEY HOLDNGS LLC, Wilmington, DE (US)

( * ) Notice: Subject to any disclaimer, the term of this patent is extended or adjusted under 35 U.S.C. 154(b) by 159 days.

(21) Appl. No.: 17/895,232

(22) Filed: Aug. 25, 2022

(65) Prior Publication Data

US 2024/0066459 A1     Feb. 29, 2024

(51) Int. Cl.
*B01D 53/00* (2006.01)
*B01D 53/04* (2006.01)
(Continued)

(52) U.S. Cl.
CPC .......... *B01D 53/0415* (2013.01); *B01J 20/20* (2013.01); *B01D 2253/102* (2013.01);
(Continued)

(58) Field of Classification Search
CPC .......... B01D 53/0415; B01D 2253/102; B01D 2257/702; B01D 2259/4516;
(Continued)

(56) References Cited

U.S. PATENT DOCUMENTS

| | | | |
|---|---|---|---|
| 1,630,459 A | 5/1927 | Zeidler | |
| 2,614,830 A * | 10/1952 | Mitchell | F16F 1/02 137/614.04 |

(Continued)

FOREIGN PATENT DOCUMENTS

| | | |
|---|---|---|
| EP | 2000657 A2 | 12/2008 |
| JP | 2016080073 A | 5/2016 |

(Continued)

OTHER PUBLICATIONS

Extended European Search Report from the European Patent Office in application No. EP23189986, dated Dec. 1, 2023.

*Primary Examiner* — Phutthiwat Wongwian
*Assistant Examiner* — Sherman D Manley
(74) *Attorney, Agent, or Firm* — WARNER NORCROSS + JUDD LLP

(57) ABSTRACT

A volume compensating device for adsorbent fill compensation in an evaporative emissions canister is provided. The device includes a planar base plate having first and second opposite surfaces. A plurality of legs extend away from the first surface of the base plate. The legs each include a terminal free end. A foot is formed at the terminal free end of each leg. An evaporative emissions canister including the volume compensating device is also provided. The evaporative emissions canister includes an adsorbent filled chamber and a void space separated from the adsorbent filled chamber by a partition. The volume compensating device is disposed in the void space. The second surface of the base plate engages the partition, the feet of the legs engage an inner surface of the void space, and the legs resiliently urge the partition towards the adsorbent filled chamber, thereby preventing the adsorbent from entering the void space.

14 Claims, 6 Drawing Sheets

(51) Int. Cl.
*B01J 20/20* (2006.01)
*F02M 25/08* (2006.01)

(52) U.S. Cl.
CPC ............. *B01D 2257/702* (2013.01); *B01D 2259/4516* (2013.01); *F02M 25/0836* (2013.01); *F02M 25/0854* (2013.01)

(58) Field of Classification Search
CPC ............ B01D 2259/4566; B01J 20/20; F02M 25/0836; F02M 25/0854; F16F 2238/022; F16F 3/023; F16F 1/027
See application file for complete search history.

(56) References Cited

U.S. PATENT DOCUMENTS

| | | | |
|---|---|---|---|
| 4,308,840 A | 1/1982 | Hiramatsu et al. | |
| 6,524,374 B2 | 2/2003 | Moriyama et al. | |
| 6,551,388 B1 * | 4/2003 | Oemcke | B01D 53/0415 |
| | | | 123/519 |
| 6,874,483 B2 | 4/2005 | Zuchara | |
| 7,005,001 B2 * | 2/2006 | Allen | F02M 25/0854 |
| | | | 55/475 |
| 7,409,946 B2 | 8/2008 | King | |
| 7,458,367 B2 * | 12/2008 | Kasuya | B01D 53/0415 |
| | | | 123/519 |
| 8,246,729 B2 * | 8/2012 | Defilippi | F02M 25/0854 |
| | | | 96/139 |
| 8,752,530 B2 * | 6/2014 | Pearce | F02M 25/0854 |
| | | | 96/138 |
| 9,328,700 B2 | 5/2016 | Mani | |
| 2004/0195171 A1 * | 10/2004 | Frye | B01D 27/08 |
| | | | 210/455 |
| 2005/0139068 A1 * | 6/2005 | Kim | B01D 53/0446 |
| | | | 95/56 |
| 2005/0188850 A1 * | 9/2005 | Allen | B01D 53/0446 |
| | | | 96/152 |
| 2005/0229787 A1 * | 10/2005 | Meiller | F02M 25/0854 |
| | | | 96/152 |
| 2008/0110440 A1 * | 5/2008 | Oh | F02M 25/0854 |
| | | | 96/147 |
| 2022/0062813 A1 | 3/2022 | Iwamoto | |
| 2023/0149846 A1 * | 5/2023 | Minezawa | B01D 53/0446 |
| | | | 96/130 |
| 2024/0066459 A1 * | 2/2024 | Huerta Ortiz | B01J 20/20 |

FOREIGN PATENT DOCUMENTS

| | | |
|---|---|---|
| JP | 6049559 B2 | 12/2016 |
| JP | 2021167592 A | 10/2021 |
| WO | 2015129900 A1 | 9/2015 |

\* cited by examiner

VOLUME COMPENSATING DEVICE FOR ADSORBENT FILL COMPENSATION IN AN EVAPORATIVE EMISSIONS CANISTER

FIELD OF THE INVENTION

The disclosure generally relates to evaporative emissions canisters for adsorption of fuel vapors in fuel powered automotive vehicles.

BACKGROUND OF THE INVENTION

Evaporative loss of fuel vapor generated within fuel tanks of the fuel systems of motor vehicles powered by internal combustion engines is a potential contributor to atmospheric air pollution by hydrocarbons. Canister systems that employ activated carbon to adsorb the fuel vapor emitted from the fuel systems are used to limit such evaporative emissions from the fuel tanks of gasoline-fueled automotive vehicles. A typical evaporative emissions canister includes a casing inside of which a gas passage is formed and filled with activated carbon as a fuel vapor adsorbent. Charge and purge ports for fuel vapor are communicated with one end of the gas passage, while an atmospheric port (vent port) for fuel vapor is communicated with the other end of the gas passage, thus allowing for charging of the canister. During stoppage of the vehicle (e.g., when parked), fuel vapor generated from the fuel in the fuel tank is introduced through the charge port into the canister and adsorbed by the adsorbent. During operation of the engine, atmospheric air is introduced through the atmospheric vent port to purge the fuel vapor in the canister by desorbing fuel vapor that was adsorbed in the adsorbent. The flow of air carries the purged fuel vapor to an intake system of the engine through the purge port so that the fuel vapor can be combusted within the engine, thus accomplishing a purging of the canister. By the desorption of fuel vapor during purging, the carbon adsorbent is regenerated and a fuel vapor adsorbing performance of the canister is revived, thereby allowing the adsorbent to repeatedly adsorb fuel vapor during periods of non-use of the engine.

The adsorbent such as activated carbon is typically contained within one or more chambers formed in the internal volume of the canister. The chamber in which the adsorbent is filled may be separated from a void space (empty chamber) in the internal volume of the canister by a partition such as a layer of foam and/or a perforated plate. Conventionally, a coil spring is disposed between the partition and a wall of the canister (such as the canister cover) to absorb/compensate for variations in the amount of adsorbent filled in the chamber by providing a biasing force against the partition in the direction of the filled chamber. The biasing force against the partition also prevents adsorbent from entering the empty chamber that is adjacent to the filled chamber. However, vibrational forces acting on the canister, as well as failure of the spring to maintain the partition in place, cause the partition to tilt, which allows the adsorbent to pass by the edge(s) of the partition and undesirably seep into the empty chamber. Therefore, a need exists for an improved device that limits or eliminates tilting of the partition and prevents adsorbent from passing the partition into the empty chamber.

BRIEF SUMMARY

An improved volume compensating device and an evaporative emissions canister including the volume compensating device are provided. The volume compensating device includes a planar base plate having first and second opposite surfaces. A plurality of legs extend away from the first surface of the base plate. The legs each include a terminal free end. A foot is formed at the terminal free end of each leg.

In specific embodiments, the legs are flat springs. In particular embodiments, the legs are cantilever springs.

In specific embodiments, the legs are connected to the base plate in an alternating side-to-side relationship such that adjacent legs are connected at opposite sides of the base plate.

In specific embodiments, the base plate includes a plurality of slots corresponding to the plurality of legs. In particular embodiments, the legs are cut out of the base plate to form the slots. In particular embodiments, the legs and slots are generally rectangular in shape.

In specific embodiments, the legs are integral with the base plate.

In specific embodiments, the legs are evenly spaced from each other.

In specific embodiments, a height of each leg defined as a distance between the first surface of the base plate and the foot of said leg in a direction normal to the first surface is less than a width of the base plate.

In specific embodiments, the base plate includes a plurality of orifices extending from the first surface to the second surface.

In specific embodiments, the base plate is generally quadrilateral in shape.

In specific embodiments, the device is monolithic in construction. In particular embodiments, the device is formed by stamping.

An evaporative emissions canister is also provided. The evaporative emissions canister includes an adsorbent filled chamber and a void space separated from the adsorbent filled chamber by a partition. The volume compensating device is disposed in the void space. The second surface of the base plate engages the partition, the feet of the legs engage an inner surface of the void space, and the legs resiliently urge the partition towards the adsorbent filled chamber, thereby preventing the adsorbent in the chamber from entering the void space.

In specific embodiments, the partition includes a layer of foam.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

Figure 1:
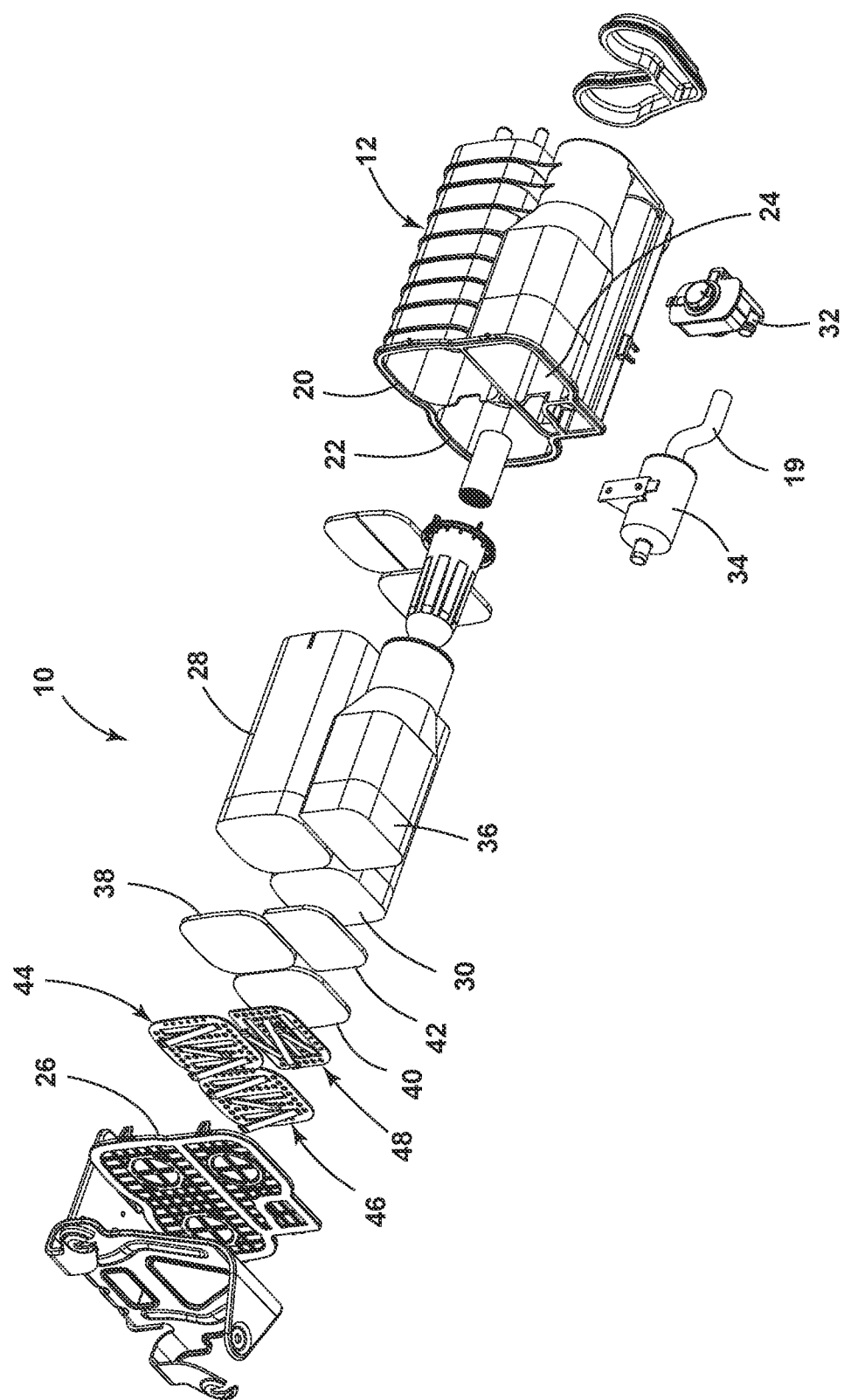
FIG. 1 is an exploded view of the evaporative emissions canister in accordance with some embodiments of the disclosure.
Figure 2:
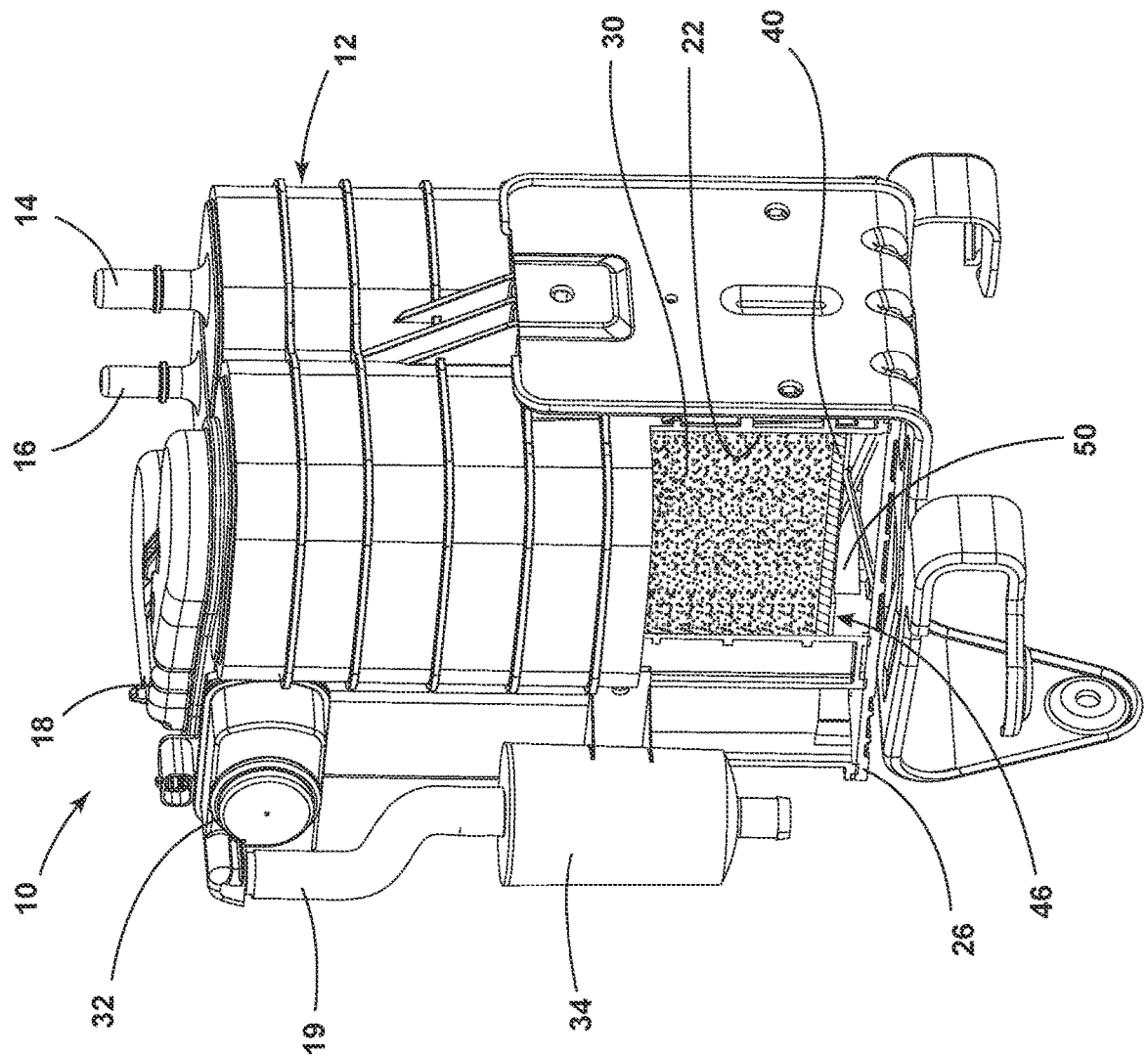
FIG. 2 is a perspective, partial sectional view of the evaporative emissions canister of FIG. 1.
Figure 3:
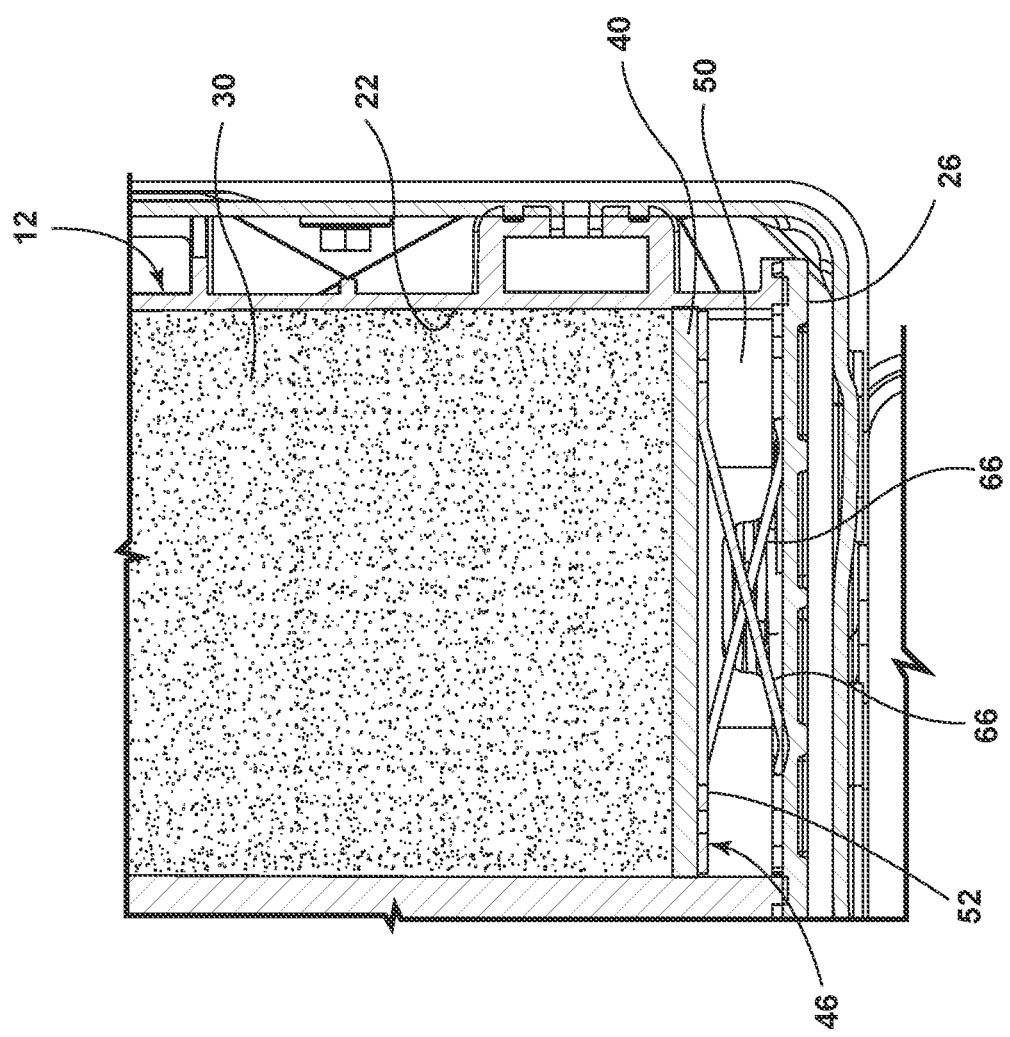
FIG. 3 is an enlarged, partial sectional view of a portion of the evaporative emissions canister of FIG. 1.

A volume compensating device for adsorbent fill compensation in an evaporative emissions canister and an evaporative emissions canister including the volume compensating device are provided. Referring to FIGS. 1-3, wherein like numerals indicate corresponding parts throughout the several views, the evaporative emissions canister is illustrated and generally designated as a fuel vapor storage canister 10 for a fuel tank of a vehicle fuel system that pumps liquid fuel, by way of non-limiting example gasoline fuel, from the fuel tank (not shown) to an internal combustion engine (not shown) that powers an automotive vehicle. The fuel vapor storage canister 10 traps fuel vapors that arise in the fuel tank during periods of non-use of the internal combustion engine due to, for example, daily variations in ambient temperatures or during refilling of the fuel tank. The fuel vapor storage canister 10 exhibits improved separation of an adsorbent filled chamber from an neighboring empty chamber within the canister.

FIGS. 1 and 2 generally depicts a fuel vapor canister 10 used in a vehicle fuel system. The fuel vapor canister 10 includes a casing (housing) 12 that forms a main body of the canister 10. The housing 12 defines an internal volume within the main body. The internal volume may be one single chamber inside the canister, or as shown may be partitioned into a plurality of chambers. The housing 12 may be by formed by molding and may be substantially impermeable. The housing 12 has at least one inlet and outlet in fluid communication with the internal volume of the housing 12. Particularly, the housing 12 has a charge port 14, a purge port 16, and a vent port 18. The charge port 14 and purge port 16 are disposed at one end of the internal volume of the housing 12, while the vent port 18 is disposed at an opposite end of a flow path through the internal volume, so that there may be fluid flow between the charge port 14 and the vent port 18 or between the vent port 18 and the purge port 16. The charge port 14 is connected to and in fluid communication with the vehicle fuel tank (not shown) via a conduit 19 or similar, while the vent port 18 is open to the atmosphere for venting the canister 10 and for admission of purge air. The purge port 16 is connected to and in fluid communication with an air intake system of the engine (not shown) via a conduit or similar. During non-use of the internal combustion engine when the engine is off, fuel vapors generated in the fuel tank travel through the charge port 14 and into the internal volume of the housing 12. The fuel vapors become trapped in the housing 12, and air exits the housing 12 through the vent port 18. During periods of use of the internal combustion engine when the engine is running, air is drawn into the canister 10 through the vent port 18, and the trapped fuel vapors are expelled from the housing 12 through the purge port 16 and into the air intake system of the internal combustion engine. It is therefore apparent that the charge port 14 is an inlet and the purge port 16 is an outlet, while the vent port 18 may be an outlet or an inlet depending on the operation of the canister 10 (charging versus purging) and the associated direction of flow.

With continued reference to FIGS. 1 and 2, in the embodiment shown the housing 10 includes a first chamber 20, a second chamber 22, a third chamber 24, and a bottom cover 26. The first chamber 20 is fluidly connected to the charge port 14 and purge port 16. The first chamber 20 contains a predetermined quantity of a first adsorbent material 28 such as but not limited to a hydrocarbon adsorption material that is an activated carbon material, and or any other suitable adsorbent material known in the art that adsorbs hydrocarbon molecules onto the surface of the material. Suitable adsorption materials include but are not limited to pelletized carbon particles, granular carbon particles, structured media of an extruded, wound, folded, pleated, corrugated, bonded, or poured form, sheets, foams, and the like. The second chamber 22 is fluidly connected to the first chamber 20 and contains a predetermined quantity of a second adsorbent material 30. The second adsorbent material 30 may also be an activated carbon material, but is not limited to activated carbon, and may or may not be the same as the first adsorbent material 28. The third chamber 24 is fluidly connected to the second chamber 22 and is also fluidly connected to the vent port 18 via a fluid pump 32 and filter 34. The third chamber 24 contains a predetermined quantity of a third adsorbent material 36 which may also be an activated carbon material, but is not limited to activated carbon, and may or may not be the same as the first adsorbent material 28 and/or the second adsorbent material 30.

Partitions such as screens 38, 40, 42 are disposed at an end of the chambers 20, 22, 24 proximate to the bottom cover 26. The screens 38, 40, 42 may be a foam material or other suitable porous material that is permeable to air and vapors but impermeable to the adsorbent materials 28, 30, 36. A first, second, and third volume compensating device 44, 46, 48 is disposed adjacent each of the screens 38, 40, 42, respectively, and in an empty void space 50 (see FIGS. 2 and 3) between the screens 38, 40, 42 and an inner surface of the bottom cover 26. Each volume compensating device 44, 46, 48 provides a rigid end to each of the first, second, and third chambers 20, 22, 24, respectively. The volume compensating devices 44, 46, 48 keep the adsorbent materials 28, 30, 36 contained within the chambers 20, 22, 24 while allowing air and vapors to flow between the each of the chambers 20, 22, 24 and the empty void space 50.

A flow path for air and fuel vapors through the canister 10 during charging of the canister (non-use of the engine) comprises flow through the charge port 14 to the first adsorbent material 28 in the first chamber 20, then past the first volume compensating device 44 through the void space 50 and past the second volume compensating device 46 into the second chamber 22, then through the second adsorbent material 30 and into another void space between the bottom cover 26 and the screen 42, then through the third volume compensating device 48 into the third adsorbent material 36 and ultimately to the vent port 18. In reverse, during purging of the canister 10, a flow path for air and fuel vapors comprises flow through the vent port 18 to the third adsorbent material 36 in the third chamber 24, then past the third volume compensating device 48 and the void space into the second adsorbent material 30 in the second chamber 22, then past the second volume compensating device 46 and through the void space 50, then past the first volume compensating device 44 and into the first adsorbent material 28 in the first chamber 20 and ultimately to the purge port 16.

Figure 4:
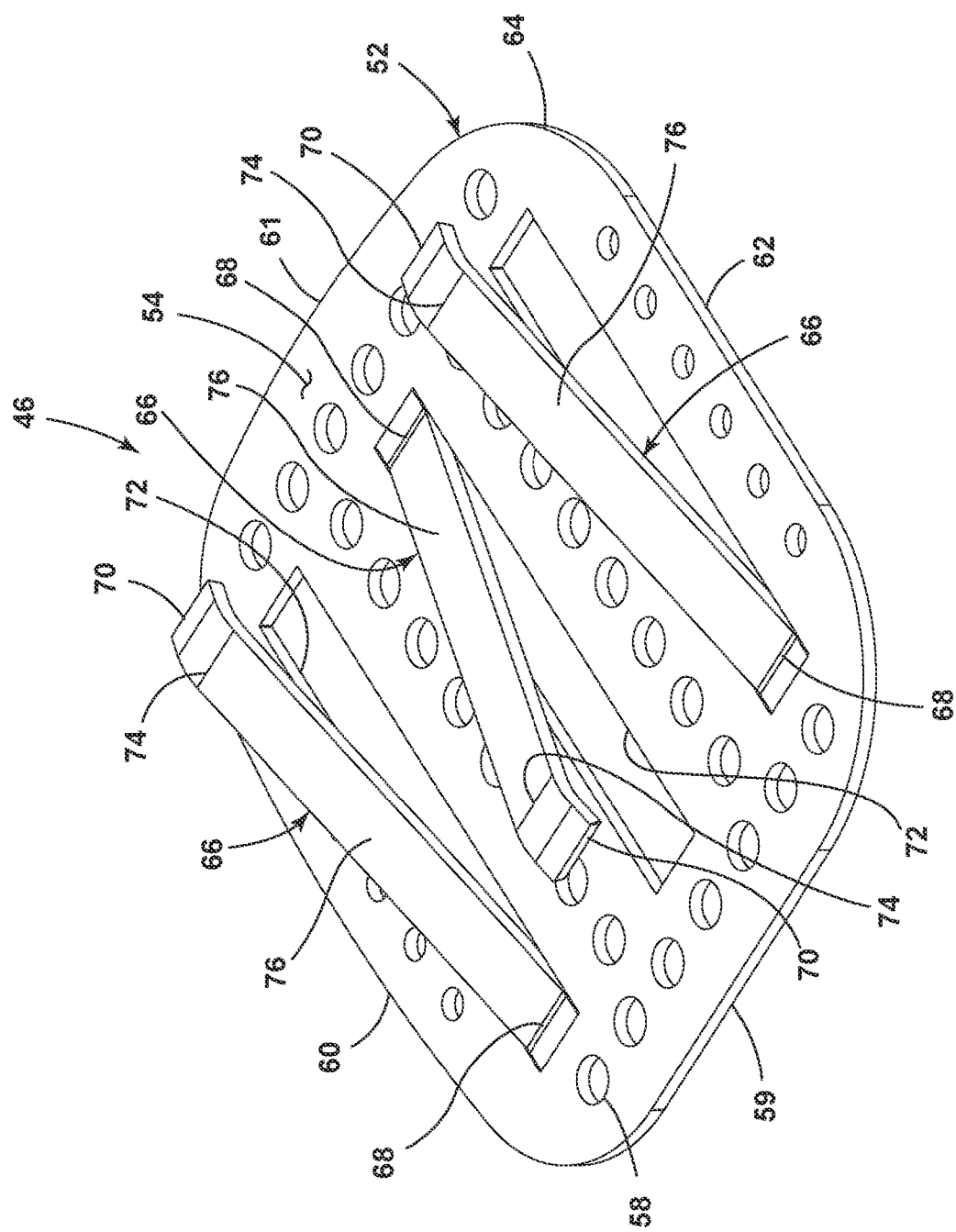
FIG. 4 is a bottom perspective view of a volume compensating device in the evaporative emissions canister in accordance with some embodiments of the disclosure.
Figure 5:
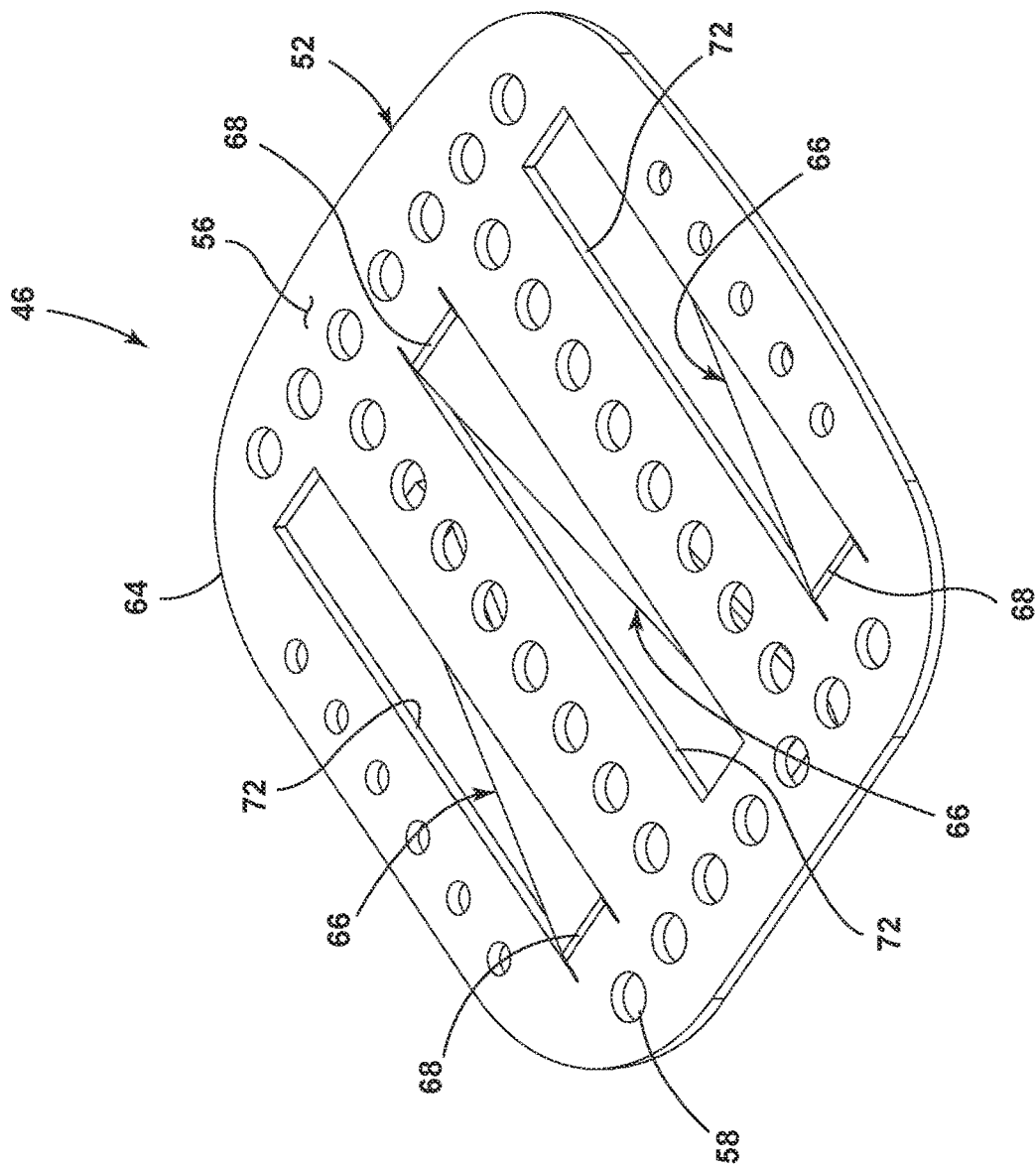
FIG. 5 is a top perspective view of the volume compensating device of FIG. 4.
Figure 6:
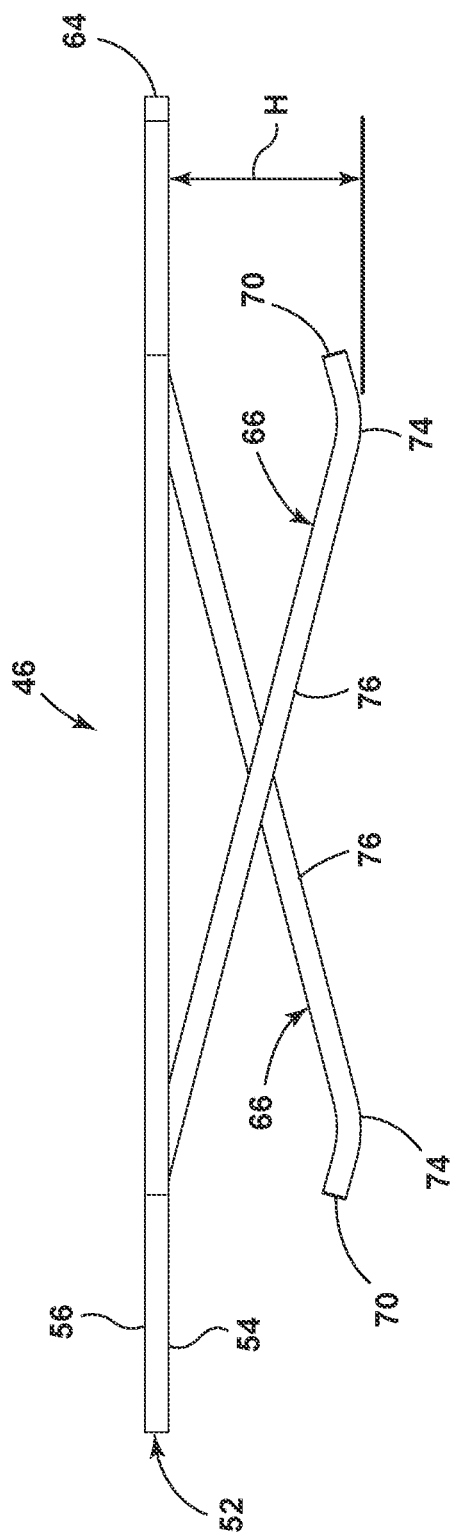
FIG. 6 is a side view of the volume compensating device of FIG. 4.

Turning to FIGS. 4-6, in some embodiments and by way of example, the volume compensating device, in this case the second volume compensating device 46, includes a planar base plate 52 having a first surface 54 and an opposite second surface 56. The base plate 52 is perforated and thereby includes a plurality of orifices 58 that provide for flow of fluid (e.g., air, fuel vapors) through the base plate 52 in a direction from the first surface 54 to the second surface 56 or oppositely in a direction from the second surface 56 to the first surface 54. The shape and dimensions of the base plate 52 are dependent upon the cross-sectional shape and size of the adsorbent chamber within the canister 10. In the embodiments shown in the Figures, the base plate 52 has a generally quadrilateral shape (e.g., square, rectangle) including four sides 59, 60, 61, 62 with rounded corners between adjacent sides. Alternatively, the base plate 52 may have a circular shape. The base plate 52 should be sized and shaped so that it's outer edge 64 mostly or completely contacts the circumference of the internal wall of the adsorbent chamber in which it is disposed. In other embodiments, such as the third volume compensating device 48, the volume compensating device 48 has a generally rectangular shape with two of the adjacent edges being rounded and the other two adjacent edges being nearly sharp edges. As is apparent from FIG. 1, the shape and dimensions of the base plate are dependent upon the cross-sectional shape of the chamber in which the volume compensating device will be disposed, and should correspond to this cross-sectional shape. Hence, the shape of the base plate for the first volume compensating device 44 and the base plate of the second volume compensating device 46 are nearly identical, whereas the shape of the base plate of the third volume compensating device 48 is different than that of the first and second volume compensating devices 44, 46.

A plurality of legs 66 extend at an angle away from the first surface 54 of the base plate 52 such that the legs 66 are all disposed to the same side of the base plate 52. Each leg 66 has a first end 68 connected to the base plate 52 and an opposite, terminal free end 70. Preferably, the legs 66 are cut out of the base plate 52 which forms a plurality of slots 72 that correspond to the plurality of legs 66. Alternatively, the slots 72 may be punched out of the base plate 52 and each of the legs 66 may be joined to the base plate 52 at a side of a slot 72. The first end 68 of each leg 66 is therefore connected to a side edge of a unique one of the slots 72. The legs 66 each generally extend at the same angle from the base plate 52 and therefore generally have the same height H which is a distance between the first surface 54 of the base plate 52 and the bottom of the foot 74 adjacent the terminal end 70 of the legs 66 in a direction normal/perpendicular to the first surface 54 of the base plate 52. The height H of the legs 66 is less than a width of the base plate 52 between two opposite sides 59, 61 of the base plate 52. The terminal end 70 of each leg 66 may include a foot 74 which is bent relative to the neighboring main portion 76 of the leg 66 The legs 66 and corresponding slots 72 are generally rectangular in shape and have a much greater length than width. The legs 66, however, are not limited in size or length, so long as the legs have a length that is less the length from one side 59 of the base plate 52 to the opposite side 61 such that the legs can be formed out of the base plate 52. The legs 66 are flat springs, and more particularly cantilever springs, that resiliently pivot about their first, connected ends 68 and are deflectable at their terminal ends 70. Adjacent legs 66 are generally evenly spaced from each other and each pair of adjacent legs 66 are generally the same distance apart. Also, the legs 66 are generally evenly disbursed about the surface area of the base plate 52. Particularly, the legs 66 are connected to the base plate 52 in an alternating side-to-side relationship whereby two adjacent legs 66 are connected to the base plate 52 at (proximate) opposite sides 59, 61 of the base plate 52. In other words, adjacent legs 66 extend in opposite directions, and when viewed from one side of the base plate 52, have a scissor-like relationship as can be seen best in FIG. 6.

In some embodiments, the volume compensating device 46 is formed by stamping a piece of metal and hence the volume compensating device in these embodiments is monolithic in construction wherein the base plate 52 and legs 66 are formed from the same piece of material. Thus, the legs 66 are integral with the base plate 52. Alternatively, as noted above, the legs 66 may be joined to the base plate 52.

As described above, and with reference particularly now to FIG. 3 by way of example, the second volume compensating device 46 is placed in the void space 50 between the screen 40 and the bottom cover 26. The feet 74 of the legs 66 contact the inner surface of the bottom cover 26, and the second surface 56 of the base plate 52 engages and presses against the screen 40. The legs 66 resiliently urge/bias the screen 40 towards the second chamber 22. The force of the base plate 52 against the screen 40 in turn compresses the second adsorbent material 30 in a direction normal to base plate 52. The compressive force compensates for any settling of the second adsorbent material 30 in the second chamber 22. The even distribution of force provided by the legs 66 also helps to maintain the compressive force in a direction normal to the base plate 52 and screen 40, thereby preventing the screen 40 from tilting and more adequately keeping the second adsorbent material 30 from passing the screen 40 and base plate 52 into the empty void space 50. Additionally, the volume compensating device 46 is a spacer that maintains a certain distance between the inner surface of the bottom cover 26 and the screen 40 at the end of the second adsorbent chamber 22. In contrast, a circular/cylindrical coil/compression spring does not as evenly distribute force against a plate/screen, and is more prone to bending or failure in which case the spring even less evenly distributes the force, allowing the screen to tilt. It should be understood that the first volume compensating device 44 and third volume compensating device 48 generally have the same structure and function in the same manner as the second volume compensating device 46 and differ primarily in their location in the canister 10 (and the corresponding dimensions of the base plate 52).

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A volume compensating device for adsorbent fill compensation in an evaporative emissions canister, the volume compensating device comprising:
    a planar base plate having first and second opposite surfaces;
    a plurality of legs extending away from the first surface of the base plate;
    the legs each including a terminal free end; and
    a foot formed at the terminal free end of each leg;
    wherein the base plate includes a plurality of slots corresponding to the plurality of legs, and the legs are cut out of the base plate to form the slots.

2. The volume compensating device of claim 1, wherein the legs are flat springs.

3. The volume compensating device of claim 2, wherein the legs are cantilever springs.

4. The volume compensating device of claim 1, wherein the legs are connected to the base plate in an alternating side-to-side relationship such that adjacent legs are connected at opposite sides of the base plate.

5. The volume compensating device of claim 1, wherein the legs and slots are generally rectangular in shape.

6. The volume compensating device of claim 1, wherein the legs are integral with the base plate.

7. The volume compensating device of claim 1, wherein the legs are evenly spaced from each other.

8. The volume compensating device of claim 1, wherein a height of each leg defined as a distance between the first surface of the base plate and the foot of said leg in a direction normal to the first surface is less than a width of the base plate.

9. The volume compensating device of claim 1, wherein the base plate includes a plurality of orifices extending from the first surface to the second surface.

10. The volume compensating device of claim 1, wherein the base plate is generally quadrilateral in shape.

11. The volume compensating device of claim 1, wherein the device is monolithic in construction.

12. The volume compensating device of claim 11, wherein the device is formed by stamping.

13. An evaporative emissions canister comprising:
    an adsorbent filled chamber;
    a void space separated from the adsorbent filled chamber by a partition; and
    the volume compensating device of claim 1 disposed in the void space;
    wherein the second surface of the base plate engages the partition, the feet of the legs engage an inner surface of the void space, and the legs resiliently urge the partition towards the adsorbent filled chamber, thereby preventing the adsorbent in the chamber from entering the void space.

14. The evaporative emissions canister of claim 13, wherein the partition includes a layer of foam.

* * * * *